July 7, 1959 A. H. HAUSMAN 2,894,067

CODE TRANSLATOR

Filed May 28, 1954

ARTHUR H. HAUSMAN,
INVENTOR,

BY [signature]
HIS ATTORNEY

United States Patent Office 2,894,067

Patented July 7, 1959

2,894,067

CODE TRANSLATOR

Arthur H. Hausman, Hyattsville, Md.

Application May 28, 1954, Serial No. 433,314

13 Claims. (Cl. 178—26)

(Granted under Title 35, U.S. Code (1952), sec. 266)

The invention described herein may be manufactured and used by or for the Government for governmental purposes without the payment of any royalty thereon.

This invention relates broadly to systems for communication by means of radio and more particularly to systems in which high speed automatic Morse telegraphy is used as a means for communication.

One object of the invention is to provide means and a method for recognizing Morse telegraph signals and distributing the same each to a unique one of a plurality of leads.

Another of the objects of this invention is to provide means for translating a high speed automatic Morse telegraph signal into a coded binary number.

An additional object of the invention is to provide a means for translating a high speed automatic Morse telegraph signal into a coded binary number which can, in turn, be translated into a pulse on a unique one of a plurality of output leads.

Other and further objects of this invention will appear and more fully be understood hereinafter as the description of the method and apparatus is developed.

This invention consists substantially in the construction, combination, and arrangement of parts hereinafter set forth and shown by the accompanying drawings and finally as pointed out in the appended claims.

Figures 1, 2:
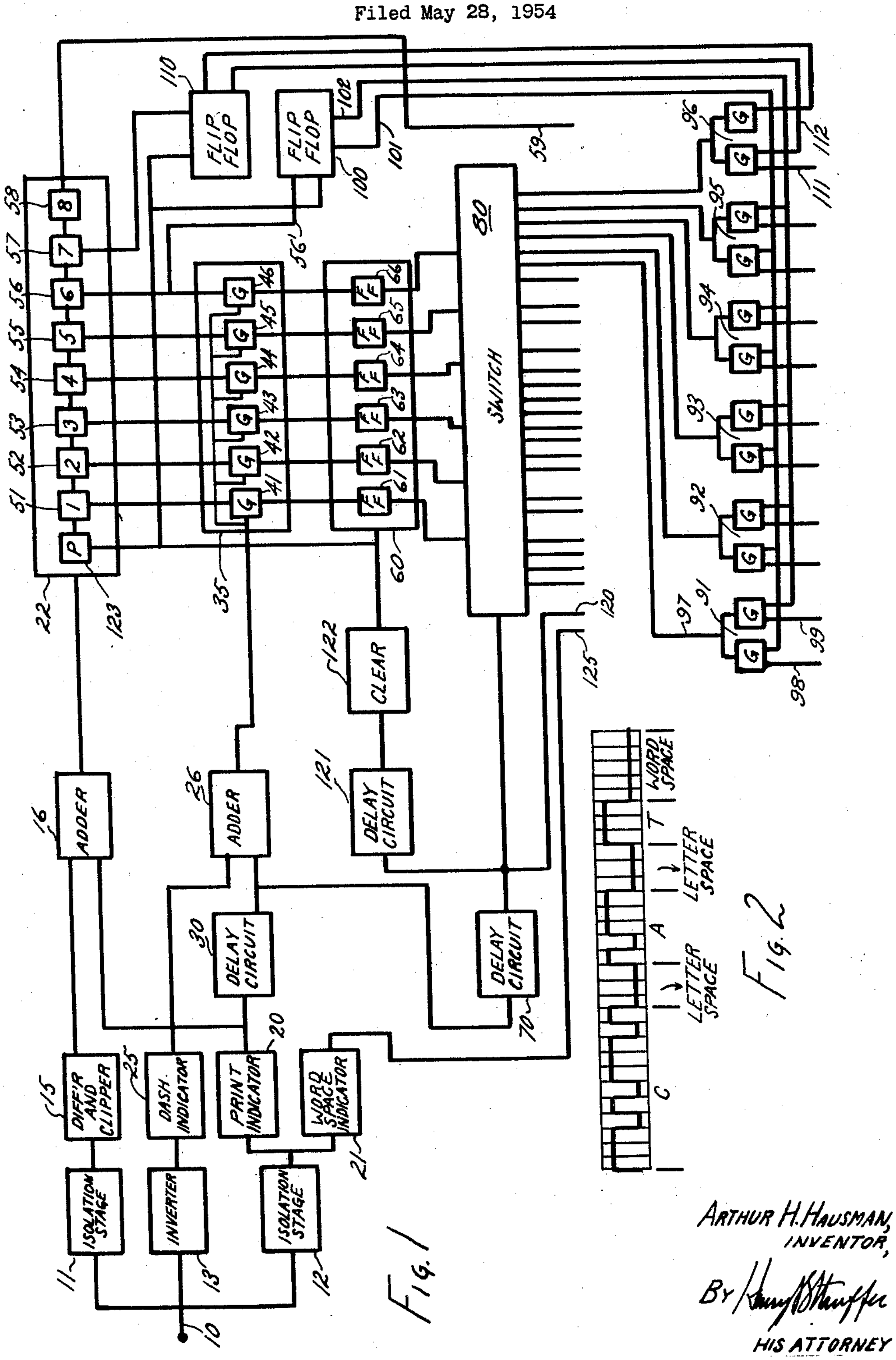
Figure 1 illustrates in block diagram the fundamental circuit arrangement of my invention.
Figure 2 illustrates the signal elements and associated spacings in the International Morse code for the word "cat."

A better understanding of the system will be obtained if the general principle of operation of the equipment is first outlined. Fundamentally, this device operates by:

(1) Counting the number of signal elements between print signals in the received Morse code (a signal element is a dot or a dash, and a print signal is a space equivalent in duration to three successive dot elements).

(2) Integrating each signal element to determine whether it is a dot or a dash.

(3) Allowing each signal to represent a binary digit and considering any dot element as 0 and any dash element as 1.

(4) Considering print impulses as signal elements, including them in the count described in (1) above, and representing them as the binary digit 1 in the binary number determined.

(5) Translating the six-digit binary number obtained to a pulse on any one of the sixty-four possible output leads.

(6) Resolving ambiguities on six of the output leads from the switch resulting from the fact that a seventh binary digit is required to express certain symbols uniquely.

By way of further explanation and referring particularly to the following list—

| | | | |
|---|---|---|---|
| A | 011000 | 1 | 011111 |
| B | 100010 | 2 | 001111 |
| C | 101010 | 3 | 000111 |
| D | 100100 | 4 | 000011 |
| E | 010000 | 5 | 000001 |
| F | 001010 | 6 | 100001 |
| G | 110100 | 7 | 110001 |
| H | 000010 | 8 | 111001 |
| I | 001000 | 9 | 111101 |
| J | 011110 | 0 | 111111 |
| K | 101100 | | |
| L | 010010 | | |
| M | 111000 | | |
| N | 101000 | | |
| O | 111100 | , | 1100111 |
| P | 011010 | ( ) | 1011011 |
| Q | 110110 | / | 1001010 |
| R | 010100 | – | 1000011 |
| S | 000100 | . | 0101011 |
| T | 110000 | AR | 0101010 |
| U | 001100 | ? | 0011001 |
| V | 000110 | : | 1110001 |
| W | 011100 | ' | 0111101 |
| X | 100110 | ; | 1010101 |
| Y | 101110 | " | 0100101 |
| Z | 110010 | error | 000000001 |

the binary numbers desired in the practice of the invention are obtained by assigning six binary digits as the normal number of digits any letter or number shall contain and seven binary digits as the maximum number of digits any symbol can contain, with the exception of the error signal which requires a nine-digit binary number for its expression.

The procedure followed in setting up binary numbers is as follows: every dot element is considered to be a 0, every dash element, a 1, and a space between characters (print signal), 1. Thus, the letter A (dot-space-dash-print signal) becomes: 0 for dot, 1 for the dash, and 1 for the print signal; this yields 011, but since six-digit numbers are required, A is written as 011000. Similarly, the number 8 (dash-space-dash-space-dash-space-dot-space-dot-print signal) becomes: 1 for the first dash, 1 for the second dash, 1 for the third dash, 0 for the first dot, 0 for the second dot, and 1 for the print signal. This yields 111001. The same procedure is followed for the Morse symbols.

Referring to the drawings, and especially to Figure 1, thereof, the input signal is applied to the apparatus at point 10 whence it is fed simultaneously to two cathode follower isolation stages 11 and 12 and an inverter stage 13. Consider first the path of the signal as it passes through isolation stage 11. The signal is differentiated and the negative pulses clipped at 15. This means that only the positive leading edges of each signal element are fed to the adder circuit 16.

Considering again the initial signal at input 10, and following the signal through isolation stage 12, it thereupon is applied to a print indicator 20 and to a word space indicator 21. These are merely integrating circuits which respond to the space impulses in the signal, see Figure 2. When a space impulse occurs, a condenser begins to charge; if the space lasts for the equivalent of three dot elements (in the case of the print indicator), or for five dot elements (in the case of the word space indicator), a positive output pulse is delivered from the appropriate indicator stage.

It will be apparent that in case of a word space, the print indicator also will respond, since the word space interval is more than three elements long, but this causes no difficulty.

The output from the print indicator 20 is fed to adder 16 where it is combined serially with the signal element pulses from circuit 15. Adder 16 may be a simple triode having two inputs, or two triodes with a common output. An arrangement such as is disclosed in the patent to Kohler, No. 2,567,214, may be employed. The output of adder 16 thus is the combination of the two input signals, and it is applied to an eight-stage ring circuit 22. Each of the signal pulses in turn steps the ring from one counter stage to the next.

Considering again the input 10, and following the signal through the inverter stage 13, it can be seen that the signal is also applied to a so-called dash indicator circuit 25. This circuit is essentially identical to the print and word space indicators. In this particular case, the dash indicator circuit delivers an output pulse if any marking signal element is the equivalent of three or more dot elements in duration. As only dash signal elements are sufficiently long to actuate this circuit, every output pulse corresponds to a dash. These impulses are then applied to another adder 26.

The output pulses from adder 26 are applied to a coincidence gate circuit 35 which operates in such a manner that, if, in any of tubes 41–46, there is a coincidence between a voltage pulse from adder 26 and a voltage pulse from the eight-tube counting chain 22, an output pulse is delivered thereby. As may be seen, each of the six gate tubes 41–46 is connected to its corresponding number in the counting ring of eight tubes, 51–58, and all gate tubes are pulsed simultaneously by the output pulses from adder 26. A coincidence tube suitable for use in circuit 35 may be found in the patent to Spencer et al., No. 2,621,250 (see V5, for example, Figure 2*d*); suitable bias must, of course, be provided to meet the conditions above set forth.

As explained above, in order to obtain a unique binary number for each letter, number, and symbol, it is necessary to count the print signal as a 1. Hence, it is necessary to provide a gate circuit control pulse subsequent to the print signal, that is, after the ring counter stage has been stepped by the print indicator pulse. To this end, therefore, the signal from the print indicator 20 is delayed a short time, at 30, and combined with the dash impulses in adder 26.

It should be particularly noted, at this point, that notwithstanding all the binary numbers so far considered contain six digits, ring circuit 22 does not step after the print signal is received; the digits following any print signal, that is, the 0's following the ultimate 1 (see the above list), do not enter into the operation of the circuit.

Thus, following the operation through for the letter C, adder 16 delivers a pulse corresponding to the leading edge of the first signal element in the Morse code for the letter C. This pulse activates counter stage 51 which delivers a voltage to gate tube 41 in the coincidence gate circuit 35. Since the first element in letter C is a dash, after a short delay, occasioned by delay circuit 30, adder 26 delivers a pulse. This pulse affects the output of gate tube 41 only, since it is the only gate tube with a voltage applied from its associated ring counter stage (51). The output from gate tube 41 is a sharp pulse which triggers a flip-flop circuit 61 in the register 60. This flip-flop, in being triggered from its normal state, nominally considered as the binary digit 0, is now considered to represent the binary digit 1.

Operation continues with an output pulse from adder 16 (representing the second signal element in the letter C). This pulse steps the ring counter to stage 52, but, since the pulse represents a dot element, no other action occurs. Hence, flip-flop 62, connected to gate 42, receives no pulse and thus represents binary digit 0.

The third action to occur results from an output pulse from adder 16, representing a dash element, and this pulse steps the counter to stage 53; immediately thereafter, adder 26 delivers a delayed pulse to gate circuit 35, as before, this time affecting only stage 43, and flip-flop 63 is set up to represent binary digit 1.

The fourth action is the result of a pulse from adder 16 corresponding to the fourth signal element received. This pulse steps the counting ring to stage 54, but, as this element is a dot, no further action ensues, and flip-flop 64 remains in its initial condition and represents the binary digit 0. These are all of the signal elements in the letter C, and they are followed by a print signal. The output pulse from print indicator 20 is fed to the adder 16 which passes the pulse to step the counting ring to stage 55. The print signal pulse is delayed slightly in delay circuit 30, and then is delivered by adder 26 to the gate circuit where it actuates stage 45 and, in turn, sets up flip-flop 65 to register the binary digit 1. Since no further action occurs, the register reads 101010, which corresponds to the letter C (see above list). This action completes the first major step in the operation of the high speed automatic Morse translator.

The next material function of the apparatus consists of interpreting the binary number (that is, the condition of register 60), and, responsive thereto, providing a pulse on a particular one of sixty-four output leads, in this case, the lead representing the letter C.

It will be recalled that the last significant pulse was the output of delay circuit 30 which operated to set up the final binary digit in the register. This pulse is delayed further in delay circuit 70, sufficiently to assure that the register is properly set up, and then is introduced to switch 80 which directs it to the proper output lead.

Switch 80 is not shown in detail since no novelty is claimed therein. Suffice it to say that it must include 6 controls (represented by the outputs of flip-flop circuits 61 through 66), 64 outputs which together represent the various letters of the alphabet, 10 digits, and the several symbols which characterize conventional telegraph apparatus, and means determined by the controls for selecting a particular output. So considered, any of many prior art arrangements are available, for example, the well known "Christmas tree" of relays or other switching elements. Such an arrangement of relays is shown in the patent to Holcomb, No. 2,343,297 (Figure 4), although the showing of the patent would have to be extended in obvious fashion by adding one control stage and thirty-two output contacts thereto. Without extending the description, it is apparent that each different combination of energized windings 154 (of the patent) determines a unique path through the circuit and thus a unique output contact. Referring to the present application a pulse from delay circuit 70 would travel the unique path to a particular one of output leads 80.

Certain ambiguities occur in the practice of the invention as so far described. Some symbols are represented by code characters which, according to this invention, translate into binary numbers identical with certain letters if only their first six digits are considered. These symbols, in other words, require seven-digit numbers for unique translation. The list follows:

| | |
|---|---|
| ? | 0011001 |
| U | 0011000 |
| : | 1110001 |
| M | 1110000 |
| ; | 1010101 |
| C | 1010100 |
| " | 0100101 |
| L | 0100100 |
| , | 0111101 |
| J | 0111100 |
| . | 0101011 |
| AR | 0101010 |

These ambiguities are resolved in the following fashion. It will be noticed that no letter character in the code here under consideration contains more than four significant code elements which means that, even when the print indicator is counted, ring circuit 22 will never count beyond stage 5 (55). The symbols which produce the ambiguities, however (see the list above), always contain six significant elements so that, with the print indicator, the ring circuit must always count to stage 7 (57).

I have therefore provided a dual gate for each of the six pairs of ambiguous characters, and the gates bear the reference characters 91, 92, 93, 94, 95, and 96. A dual gate as the term is herein used, is a two-tube gate stage having a single input, as 97, and two outputs, as 98 and 99. The dual gate has a normal condition in which it will pass an input signal to one output, as 98, and not to output 99, and a second condition wherein a contrary situation exists. A flip-flop circuit 100 controls the conditions of gate circuits 91—95 (96 being treated separately, as below described).

Normally, the "letter" outputs, as 98, are in active condition, but when flip-flop 100 is triggered, it furnishes a pulse over conductor 102 to cause the "symbol" outputs to become active, and the "letter" outputs, inactive. Upon restoration to initial condition, as will be later described, flip-flop 100 furnishes a pulse over conductor 101 to return the dual gate circuits to their starting conditions.

The triggering pulse for flip-flop 100 is supplied from ring stage 56 (over line 56'); and this stage, as already explained, is not reached during translation of letter characters. The operation of stage 6 (56) of the ring circuit thus establishes that a received signal represents a symbol and not a letter. Stage 6 then supplies a pulse to flip-flop control circuit 100, which in turn changes the conditions of the dual gate 91—95 so that the ring circuit pattern is properly translated as a symbol.

One other ambiguous situation arises in code translation according to my invention. The binary code signals for a "period" and for the symbol "AR" are identical in their first six elements, the only difference occurring in the seventh element. The procedure is like that above described except that the dual-gate 96 is controlled by a different flip-flop circuit 110, and is not associated with the other gate circuits. If and when, in other words, ring circuit 22 reaches stage 7 (57), a pulse is supplied to dual-gate 96, and its condition is altered to provide a conductive path to output 112 and open the circuit to output 111.

The Morse code includes a symbol for indicating that an error in transmission has been made. This consists of a character made up of eight dot elements followed by a print indicator. According to my invention, this means that ring circuit 22 will operate through one complete cycle and a pulse will be obtained on lead 59 direct from stage 58. The print indicator is not in this case necessary to the identification of the symbol.

It has been explained that the print signal is employed in setting up the binary number which represents a received character, and that it is then delayed and utilized to control the gate circuit. It is further delayed, at 70, and provides an output for lead 120, which serves to control a tape-advancing mechanism, typewriter carriage actuator, etc. (the end apparatus forming no part of the present invention). Delayed still further, at 121, it triggers a clearing circuit 122, which provides one or more pulses for returning the various circuit elements to their initial states, and, cooperating with priming means 123 of ring circuit 22, prepares the ring circuit tubes for another character.

Word space indicator 21 furnishes an output to lead 125 in obvious fashion to actuate a typewriter carriage, etc.

The foregoing is in specific terms, and many modifications will readily suggest themselves, so that for the true scope of the invention reference should be had to the appended claims.

I claim:

1. An apparatus of the nature described including means for receiving signals each normally comprising a succession of dot and dash elements, terminated by a print element, means for translating a said succession into a unique binary number including means responsive to any dot element for generating a corresponding binary digit of one value and means responsive to any dash element for generating a corresponding binary digit of the other value, means responsive to the succeeding print element for generating a binary digit of one of said values, a plurality of output leads, pulse producing means, and means responsive to said number for selecting a said lead for energization by said pulse producing means.

2. An apparatus of the nature described including means for receiving signals wherein intelligence is normally represented by groups of dot and dash elements normally terminated by a special signal, circuit means for counting the dot and dash elements occurring between said special signals, means responsive to said dot elements for producing binary digits having one value and means responsive to said dash elements for producing binary digits having another value, and means responsive to each said special signal.

3. The invention of claim 2, further characterized by a plurality of output leads for said apparatus, and means for selecting a unique output lead for each unique succession of binary digits.

4. The invention of claim 2, further characterized by a plurality of output leads, and means for furnishing an output to one of said leads only responsive to a predetermined quantity of said elements.

5. The invention of claim 2, further characterized by a plurality of output leads certain of the same being arranged as related pairs, and means actuated responsive only to a predetermined quantity of said elements for selecting a lead of a said pair.

6. An apparatus of the nature described for translating Morse telegraph characters consisting of dot, dash and print components which includes means responsive to said dot and dash components for supplying a pulse for each such component, means responsive to said print components for supplying a pulse for each such component, a ring circuit including a plurality of stages, means for applying said pulses successively to said ring circuit to cause the same to step one position for each said pulse, a plurality of gate circuits associated individually with the stages of said ring, means for supplying pulses responsive to the said dash components and for successively applying said pulses to said gate circuits simultaneously, means for delaying each said print component pulse and for applying it to said gate circuits subsequent to its application to said ring circuit, whereby to obtain a pulse from each gate circuit when its associated ring stage supplies a pulse coincident with dash and print component pulses, a register comprising a plurality of flip-flop circuits each associated with a different one of said gate circuits each flip-flop circuit having a normal condition and a second condition assumed responsive to a pulse from its associated gate circuits, a plurality of output leads, and means responsive to the combined conditions of said flip-flop circuits for selecting a unique one of said leads.

7. In an apparatus of the nature described, an input for a telegraph signal comprising character sequences of dot, dash, and letter space intervals each followed by a word space interval wherein each complete character sequence is terminated by a letter space interval which serves as a print signal, means for counting the dot and dash intervals occurring in a sequence, means for adding to the total thereof one unit representing the print signal terminating the sequence, a ring circuit including at least eight stages, means for feeding successive pulses to said last mentioned circuit to step the same from one stage to the next said pulses equaling in number the total of said counting means including the unit representing the print signal, other means for counting the dash intervals in a sequence to the exclusion of the dot intervals, a plurality of six gate circuits connected in order to the first six stages of said ring circuit and further connected to said other counting means said gate circuits being operative to furnish an output pulse when a voltage from its connected ring stage coincides in time with a pulse from said other counting means, means for delaying a print signal relative to its introduction to said ring circuit and utilizing the same to pulse said gate circuits, a flip-flop circuit connected to each of said gate circuits each flip-flop circuit having a normal condition and a second condition assumed responsive to a pulse from its gate circuit, a switching element containing a plurality of circuits and a plurality of outputs, and means dependent upon the combined conditions of said flip-flop circuits for determining one of said circuits and one of said outputs, and means for delaying said print signal relative to its introduction to said gate circuits and introducing the same to said determined circuit.

8. The invention of claim 7 further characterized by an additional output and means responsive to said last mentioned delayed print signal for energizing the same.

9. The invention of claim 7 further characterized by another output and means responsive to said word space intervals for energizing the same.

10. The invention of claim 7 further characterized by a plurality of dual circuits each having a normal condition and a second condition and means controlled by the conductivity of the sixth stage of said ring circuit for causing said dual circuits to change their conditions.

11. The invention of claim 7 further characterized by five dual gate circuits each having a normal condition and a second condition and means controlled by changes in the conductivity of the sixth stage of said ring circuit for causing said dual gate circuits to change their conditions, a sixth dual gate circuit of the nature mentioned, and means responsive to a change in the conductivity of the seventh stage of said ring circuit for causing said further dual gate circuit to change its condition.

12. The invention of claim 7 further characterized by an output responsive to a change in the conductivity of the eighth stage of said ring circuit.

13. The invention of claim 7 further characterized by means for further delaying said last mentioned delayed print signal, and means responsive thereto for restoring said flip-flop circuits to normal condition and for priming said ring circuit.

References Cited in the file of this patent

UNITED STATES PATENTS

| | | |
|---|---|---|
| 2,534,387 | Thomas et al. | Dec. 19, 1950 |
| 2,534,388 | Shenk et al. | Dec. 19, 1950 |
| 2,621,250 | Spencer et al. | Dec. 9, 1952 |